United States Patent [19]

Juve et al.

[11] Patent Number: 4,550,682

[45] Date of Patent: Nov. 5, 1985

[54] MICRO CRANE FINISHING LINE SYSTEM

[75] Inventors: Robert J. Juve, Sterling Heights; Michael J. Eagen, Pleasant Ridge, both of Mich.

[73] Assignee: McGraw-Edison Company, Rolling Meadows, Ill.

[21] Appl. No.: 584,034

[22] Filed: Feb. 27, 1984

[51] Int. Cl.⁴ ............................................. B05C 3/09
[52] U.S. Cl. ..................... 118/425; 134/76; 212/213; 212/215; 414/222
[58] Field of Search ............... 134/76; 212/205, 213, 212/215; 118/425; 414/222

[56] References Cited

U.S. PATENT DOCUMENTS 2,822,094  2/1958  Greer ............................ 212/213
4,377,986  3/1983  Juve ........................... 118/425 X Primary Examiner—Evan K. Lawrence
Attorney, Agent, or Firm—Jon Carl Gealow; James A. Gabala; Hugh M. Gilroy

[57] ABSTRACT

A material finishing line including a essentially linear array of work stations is disclosed. A stationary support beam extends over the work stations and substantially encloses a transmission, and supports at least one crane body and a drive means to selectively propel the crane body along the support beam. The crane body is an assembly of components arranged to raise workpieces from the work stations towards the support beam. A 'U' shaped cart supports lift means to provide power to raise a lift arm and supports the lift arm and a lift arm guide. The vertical extensions of the support beam and of the cart are reduced and nearly overlap, and the vertical extension of the lift arm may be lifted into substantially overlapping relationship with the vertical extension of the cart. The ability to substantially tuck the lift arm onto the cart and a reduced vertical extension of the cart and support beam provide a material finishing line which only requires minimal headroom while reducing the dead space through which a workpiece cannot be lifted. To the same end, transmission means to propel the cart and conductors to supply the mobile lift means are substantially contained within the support beam and cart. Additionally the support beam is an assembly of support modules, which in turn are assemblies of easily fabricated standard shapes. Similarly the crane body components are assembled from easily fabricated standard shapes.

10 Claims, 7 Drawing Figures

MICRO CRANE FINISHING LINE SYSTEM

BACKGROUND OF THE INVENTION

The present invention relates to material finishing lines and more particularly to material finishing lines having a substantially linear array of work stations located in a building with constricted headroom. Most particularly the present invention is directed to material finishing lines where the work stations are liquid filled tanks into which the workpieces are successively dipped. Exemplars of such material finishing lines abound in the plating industry.

Frequently, with considerable expense, a plating operator will design its own line. In such circumstances, the typical design will include an overhead beam from which depends a traveling chain or cable hoist and from which a workpiece hook depends. The result while somewhat inexpensive can have a number of drawbacks. The principal drawback is the resulting dead space which shortens the lift range between the tops of the tanks and the workpiece hook for a given height of the beam. Where headroom for the material finishing line is limited, structural alterations to the floor or ceiling of the room may be necessary. A number of suppliers of plating lines usually avoid the extreme excessive dead space resulting from unsophisticated designers.

Examples of such lines are provided by U.S. Pat. No. 4,377,986 to Juve and U.S. Pat. Ser. No. 493,671, filed May 11, 1983 on behalf of Juve, each owned by McGraw-Edison Company, assignee of the present application. Each reduces the dead space over the unsophisticated design but neither a directed to providing minimal dead space in a comparatively low cost finishing line.

The patent titled "Hoist Plating Line" employs a vertically movable track along which a plurality of carts are horizontally propelled. While quite suitable in attaining its design goals, the hoist plating line does not minimize the dead space since the carts depend from the track and are in a vertically fixed relationship with the track.

Similarly the Patent Application titled "Hoist-Type Material Finishing Line" is quite suitable in achieving its objectives but does not provide a relatively low cost line with minimal dead space. There a self propelled hoist carrying a pick up arm slidably disposed on, and cantilevered from, a vertically extending guide transverses the line along a floor mounted track. The pick up arm has a substantial vertical extension since it is cantilevered and the floor mounting of the self propelled hoist may require floor leveling.

SUMMARY OF THE INVENTION

The present invention provides a relatively low cost material finishing line with minimal dead space which is particularly suitable for installation in structures with limited headroom. A stationary support beam extends over an essentially linear array of work stations. Supported on the beam is a crane body which is selectively propelled along the longitudinal extension of the support beam by a transmission means driven by drive means also supported by the beam. The crane body is assembled from components and lifts the workpiece towards the support beam. The principal components of the crane body are a cart, a lift arm, a lift arm guide for the lift arm and lift means to support the lift arm. These components are in turn assembled from easily fabricated shapes.

The basically 'U' shaped cart straddles the stationary support beam with its arms extending upward. The arm extension of the cart is substantially the same as the vertical extension of the support beam. Cart wheels intrude from the arms to ride along a horizontal portion of a 'L' shaped flange portion of the support beam. The cart is maintained in lateral alignment on the beam by alignment blocks mounted on the arm near each wheel. The movable cart supports all other components of the crane body.

The basically 'U' shaped lift arm guide body depends from the cart with the base of the 'U' slightly angled from the vertical. The arms of the 'U' straddle the cart and are fixedly connected to the cart near their upward extremity which coincides with that of the cart. A 'C' shaped guide channel opening to the interior extends from the cart and arm tops to the arm bottom on each arm of the lift arm guide.

The lift arm is 'U' shaped with the base of the 'U' aligned horizontally. In side view each arm is nearly a right equilateral triangle having a horizontal side and a vertical side of near equal length. Lift wheels extend outwardly from each arm near the extremities of the vertical side of the triangle to ride in the guide channels of the lift arm guide. The near equal lengths of the vertical and horizontal sides of the arm provide a good stability ratio to guide the cantilevered load imposed by the workpiece. A lift arm cross member with a stiffening web extends between the arms of the 'U' shaped lift arm near the end of the horizontal side of the triangle away from the vertical side. The vertical extension of the vertical side of the triangular arm is very close to being equal to the vertical extension of the arms of the cart. The vertical extensions of the support beam and the cart are minimized as is that of the lift arm. The cart and beam vertical extensions are fixed in a near overlapping relation. The vertical extension of the lift arm may be brought into overlapping relation with that of the cart. This tucking of the lift arm onto the cart minimizes the dead space through which a workpiece cannot be moved in the material finishing line.

The tucking of the cart is attained by lift means carried in the base of the cart raising the lift arm onto the cart. The lift means is, of course, also used to lower the lift arm to place the workpieces at the work stations. Preferrably the lift means is a double spooled motor hoist from which chains or cables are connected to the lift arm stiffening web on the lift arm cross members.

The ability of the crane body to tuck the lift arm onto the cart would not alone fully achieve reduced dead space, if other components were not in vertical overlapping relation. The transmission means is carried within the support beam to convey power from stationary drive means to a drive bracket on the cart. At an end of the beam the drive motor with gearing depends outside the area where workpieces are to be moved. Preferrably the transmission means is a continuous roller chain. An idler gear at the other end of the support beam guides and supports the undriven end of the chain loop. Conductors for supplying power to the lift means motor are guided by a rolling conductor support carried on the support beam top below the uppermost extremity of the cart.

The stationary support beam is an assembly of support modules each of which is easily fabricated from standard shapes to obtain the design objectives of vertical compactness and strength while allowing the accommodation of other components. Each support module is basically fabricated from five standard shapes. The support module includes two 'Z' shaped side portions with the vertical rise of the 'Z' extending longitudinally of the module and the top horizontal portion extending outward. An inverted 'U' shaped top section connects the side portions between the mid point of the vertical rises of the 'Z's' and their tops. The base of the 'U' is sufficiently wide to accommodate the lift means in the cart between the lower horizontal arms of the 'Z's' which intrude in the beam. Spaced beneath the outwardly extending arm of the 'Z' is a longitudinally extending 'L' section with one arm extending horizontally outward. The space between the arms of the 'Z' and the 'L' is sufficient to comfortably accommodate the carts wheels while preventing them from jumping the track formed by the 'Z' and the 'L'. Adjacent each end of the support module, connection means are provided to join support modules and to support the drive means and idler gear housings. The stationary support beam may be supported by hangers or mounted on columns. Guides for the continuous roller chain are advantageously located on the interior horizontal arm of the 'Z' and directly above the 'Z' arm on the top of the 'U' section of the support beam. The rolling conductor support between the fixed source of power and the cart is adjacent the transmission meansguide on the top of the support beam without extending over the mid longitudinal section of the support beam.

In some applications of the material finishing line, it is desirable to have two mobile crane bodies. The drive means for each crane body is located at an opposite end of the beam from the other. Likewise the transmission and conductor supports for each cart only occupies a respective half of the longitudinal section of the support beam.

In this manner the present invention provides a material finishing line which is easily fabricated and relatively low cost with reduced dead space and particularly suitable for installations with constricted headrooms.

BRIEF DESCRIPTION OF THE DRAWINGS

FIG. 4 is a partial end view of the hoist of the present invention taken along line 4—4 of FIG. 2;

DETAILED DESCRIPTION OF THE PREFERRED EMBODIMENTS

Figure 1:
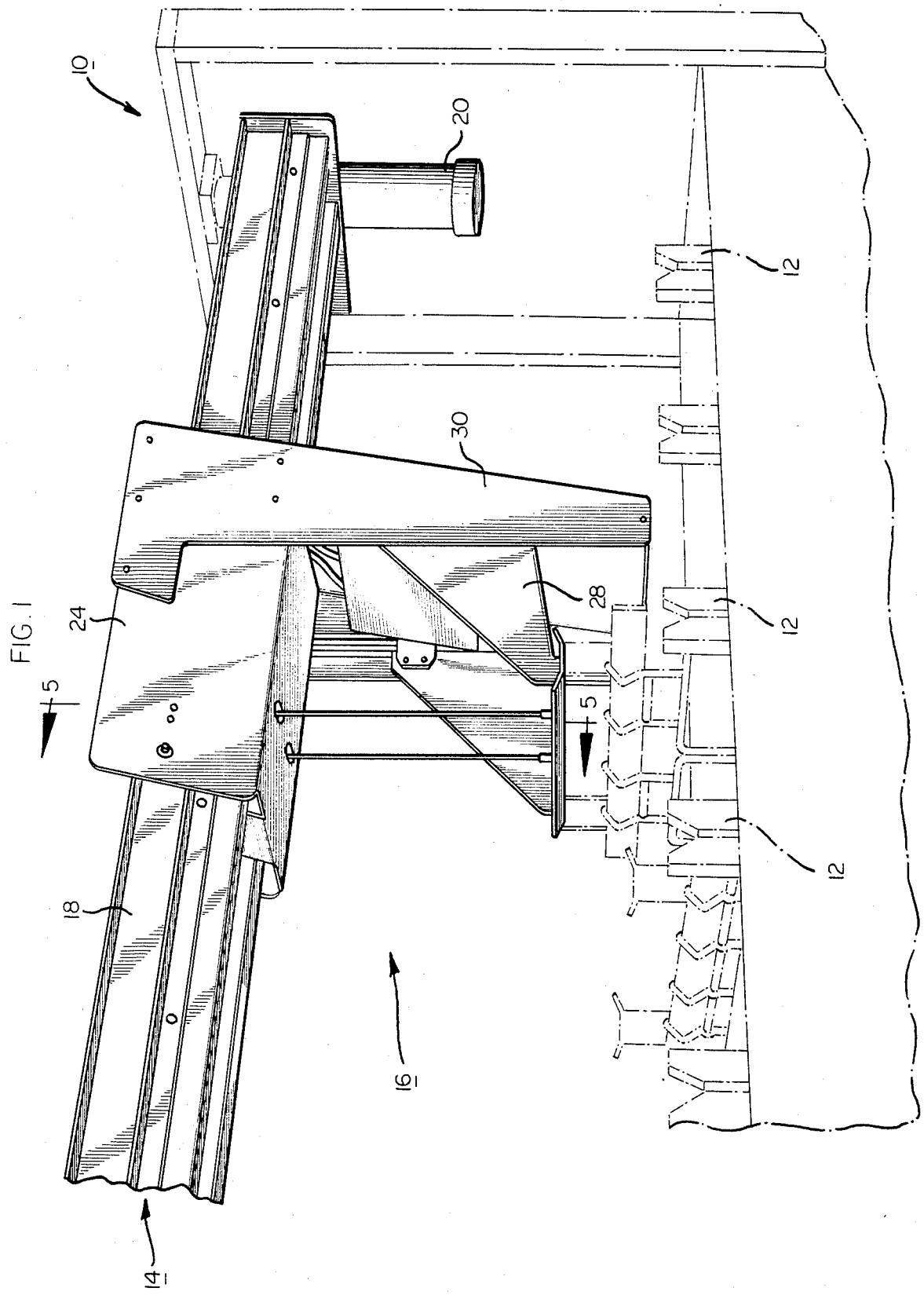
FIG. 1 is a perspective view of the material finishing line of the present invention.

FIG. 1 is a perspective view of the material finishing line 10 of the present invention. A linear array of the work stations 12, here being immersion tanks, are disposed below a hoist 14. Hoist 14 employs a traveling crane body 16 which traverses stationary support beam 18 to raise and lower workpieces to and from work stations 12. Stationary drive means 20 is operatively connected through transmission means 22 (FIG. 2) to crane body 16 to position the crane body horizontally along stationary support beam 18. Hoist 14 may selectively position workpieces among work stations 12.

Figure 2:
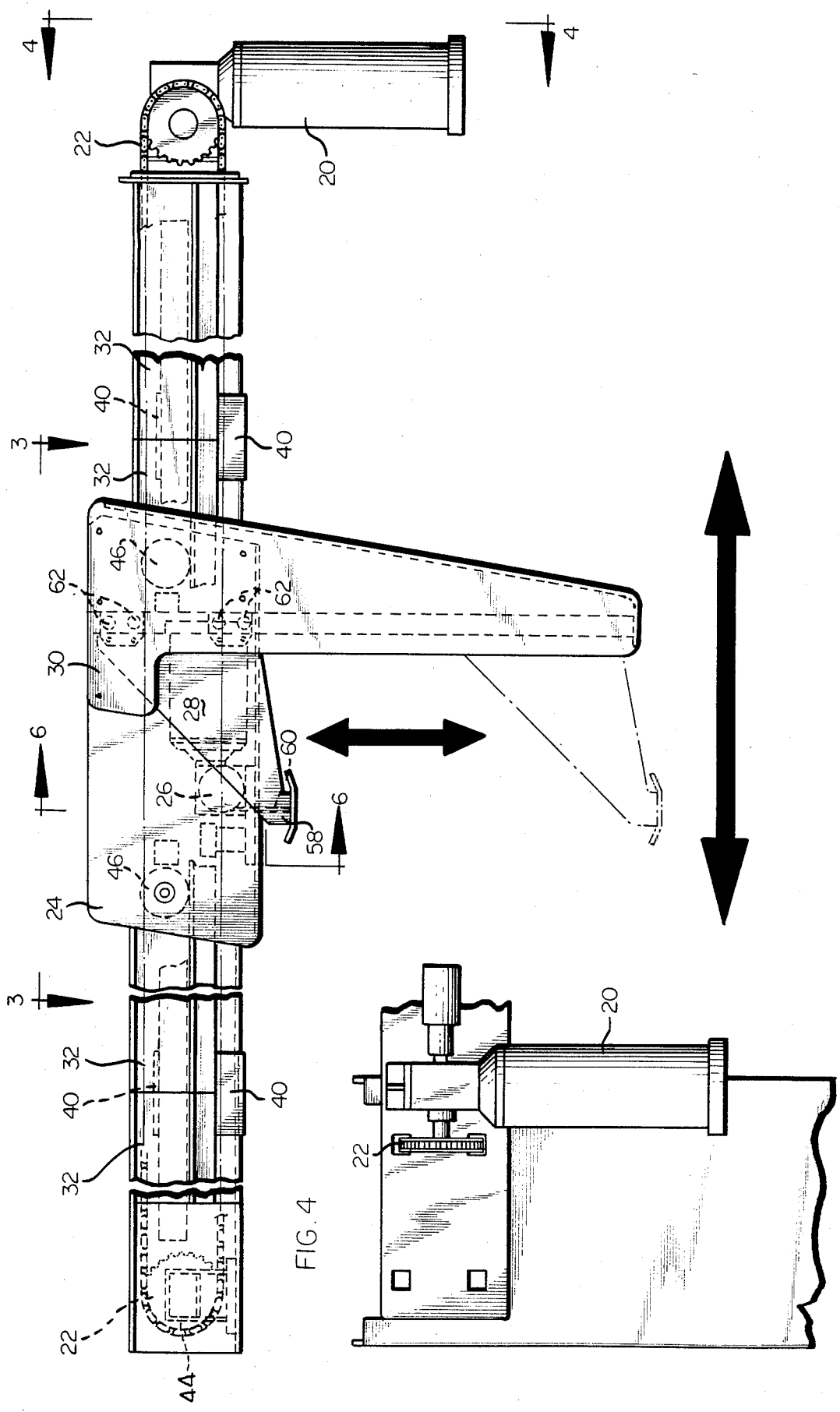
FIG. 2 is a side view of the hoist of the present invention.
Figure 3:
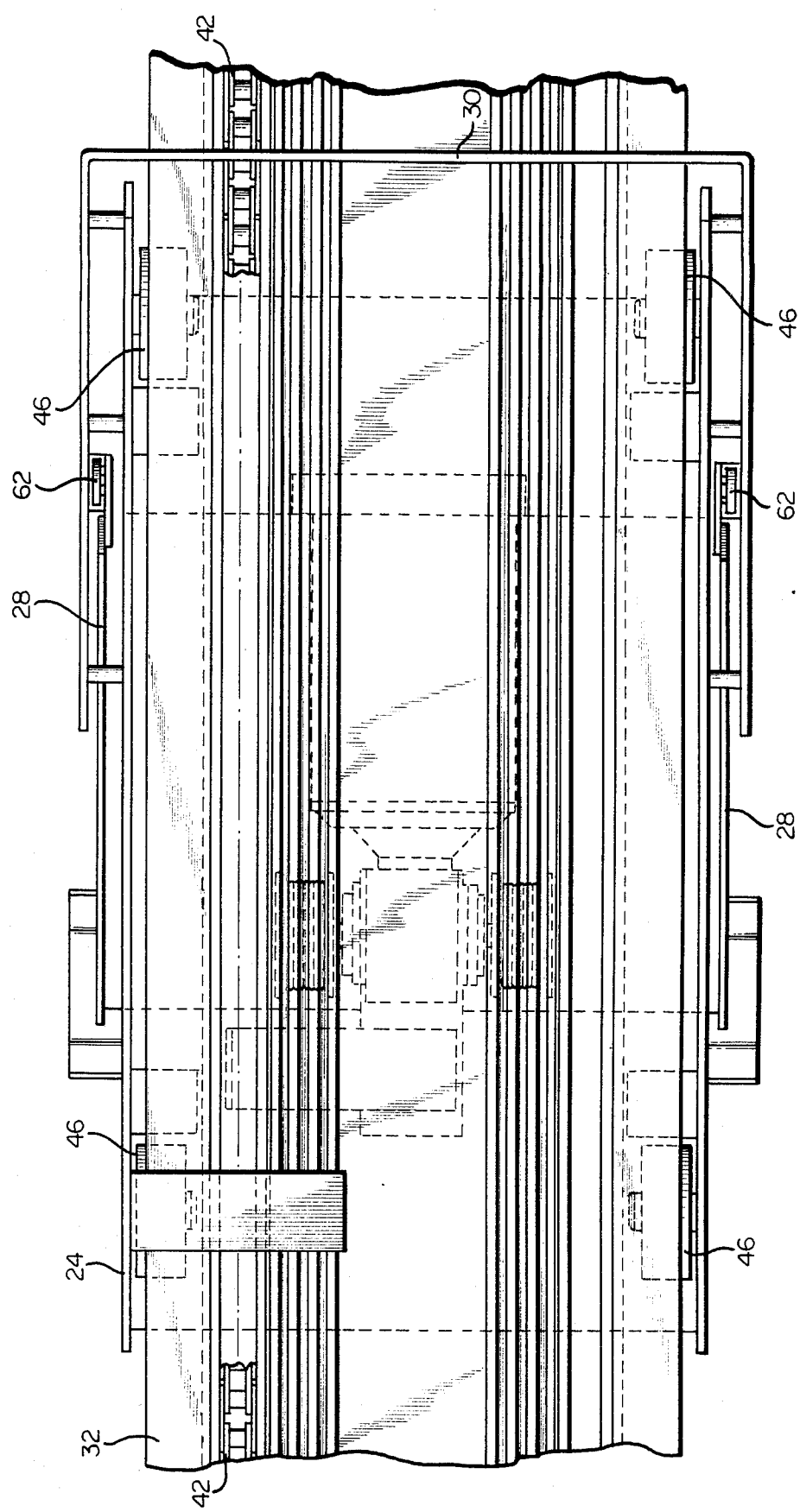
FIG. 3 is a plan view of the crane body of the present invention.
Figure 5:
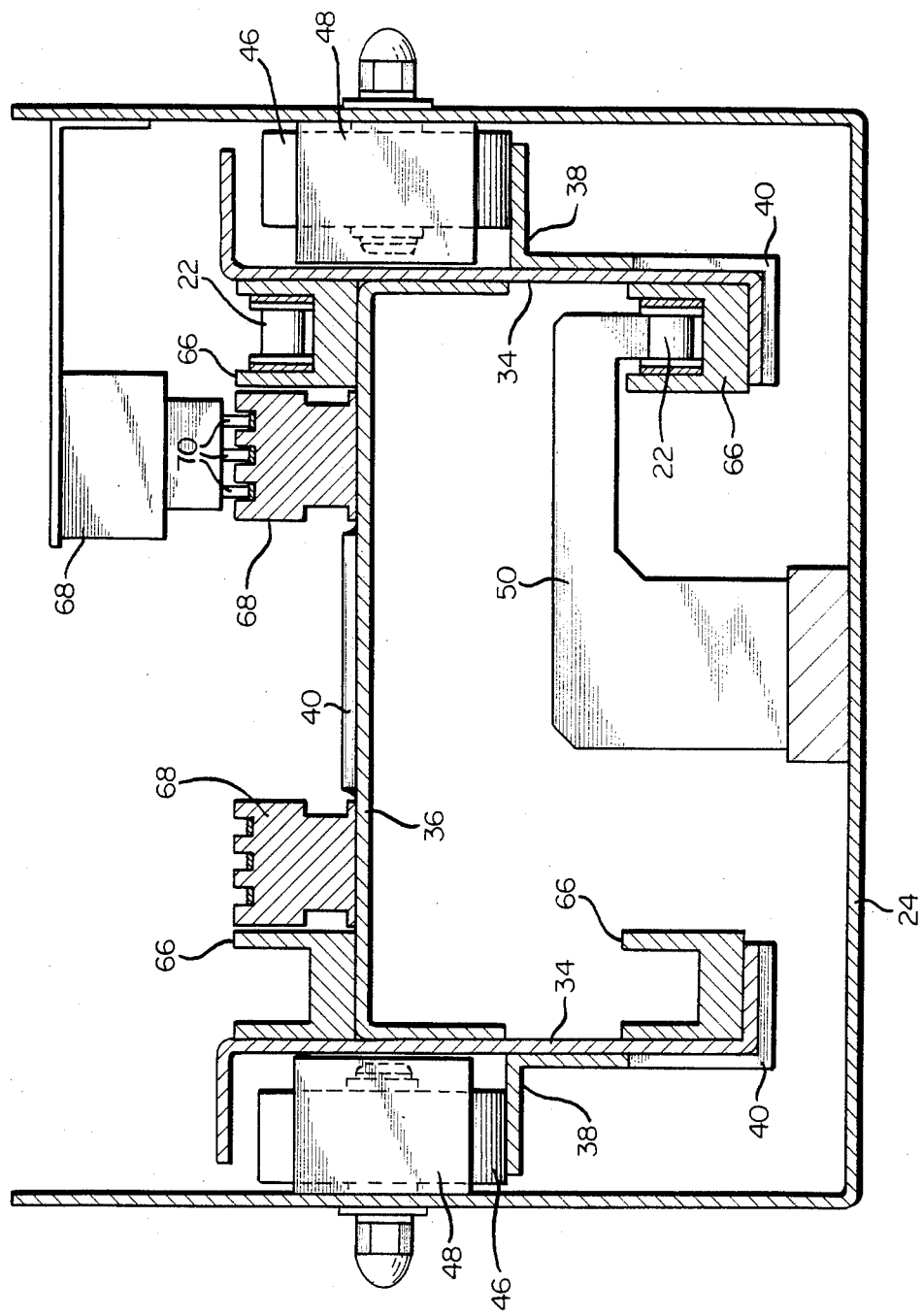
FIG. 5, is a sectional view along the line 5—5 shown in FIG. 1, of the present invention.

Crane body 16 is assembled from a number of components as is best seen in FIGS. 2, 3 and 5. A 'U' shaped cart 24 straddles support beam 18 and is supported by it. In turn, cart 24 supports the remaining components of crane body 16. Lift means 26 is supported on the base of cart 24 beneath support beam 18. The major portion of the vertically fixed components of lift means 26 extend above the lowest extremity of stationary support beam 18. Lift means 26 in turn supports lift arm 28. Lift arm 28 is also basically 'U' shaped and is the vertically movable portion of crane body 16 which raises and lowers workpieces. Lift arm 28 is restrained from moving in a horizontal plane by lift arm guide 30. Lift arm guide 30 is likewise 'U' shaped in cross-section and is fastened to and depends from cart 24.

FIG. 2 shows a number of aspects of the present invention which tends to reduce the dead space through which a workpieces cannot be lifted, while minimizing the total height of hoist 14. The vertical extension of support beam 18 is only slightly less than the vertical extension of cart 24. These vertical extensions substantially overlap in a fixed vertical relationship. The vertical extension of lift arm 26 very closely coincides with that of cart 24. Further, these vertical extensions of lift arm 28 and cart 24 may be brought into overlapping relationship as shown. In short, the lift arm may be essentially tucked onto cart 25. The desired result is a minimal extention between the lowest portion of lift arm 28 in its fully raised position and the top of cart 24, while maximizing the range of lift of lift arm 28.

Support beam 18 is an assembly of support modules 32 as is best seen in FIG. 2. Each support module 32 is basically fabricated from five standard shapes as may be best seen in FIG. 5. Each support module 32 includes two 'Z' shaped support sides 34, a 'U' shaped support top 36 connecting the support sides 34, all 7 gauge sheet two 'L' shaped supports 38 disposed below support top 36 to the outside of support sides 34, and support connection means 40. Support sides 34 are disposed so that the vertical rises of the 'Z's' are vertical with the upper arms extending outwardly from the inverted 'U' support top 36 joining support sides 34 together. Similarly, the lower arms of the Z intrude towards the longitudinal center line of support module 32. The base of the inverted 'U' shaped tap 36 is affixed to the vertical rise of 'Z' shaped support side 34 between is midpoint and the top of support side 34. Support top 36 is of sufficient width to allow the lower portions of support sides 34 to straddle lift means 26 without interference. The outwardly extending horizontal portions of 'L' shaped supports 38 are spaced below the outwardly extending portions of the upper Z-arms of support side 34. The vertex of the 'L' shaped support 38 is adjacent to the lower most extremity of the 'U' shaped top 36. Support connection means 40 here shown two short lengths of angle and a plate, bridge and connect support modules 32. Interfitting one end of a support module 32, within the adjacent end of another support module 32 is being considered as connection means 40.

Stationary drive means 20 with its associated support structure is located at one extremity of support beam 18. It is here illustrated as a angled drive direct, current motor which drives transmission means 22. Transmission means 22 extends substantially throughout hoist 14 and appears in FIGS. 2, 3, 4 and 5. Transmission means 22 includes a continuous loop of roller chain 42. Roller chain 42 is driven by stationary drive means 20 and at its undriven end is supported, guided and tensioned by idler gear 44 contain within its support structure.

Cart 24 is basically an inverted 'U' shaped body which is supported by stationary support beam 18 and in turn supports the remaining components of crane body 16. Four cart wheels 46 are affixed to the vertical arms of the cart body and intrude towards support beam 18. Cart wheels 46 rotate on the horizontal portion of the 'L' shaped supports 38 to facilitate transverse movement of crane body 16. Cart wheels 46 run in the track created by the horizontal portion of 'L' shaped support 38 and the upper horizontal portion of the 'Z' shaped support sides 34. To reduce noise cart wheels 46 have polyethelene tires. Adjacent each cart wheel 46 is an alignment block 48 which may be a tought self-lubricating plastic, fastened to the arms of cart 24. Ultra-high molecular weight polyethelene is a preferred plastic. Alignment blocks 48 restrict side to side movement of cart 24 on support beam 18. Simiarly, the outwardly extending horizontal portions of 'Z' shaped support sides 34 and 'L' shaped supports 38 restrict the up and down movement of cart 24 to prevent it from jumping the track. The base of cart 24 supports drive bracket 50, as is shown in the FIG. 5. Drive bracket 50 provides the connection between transmission means 22 and cart 24 to allow cart 24 to be driven along support beam 18.

Figure 6:
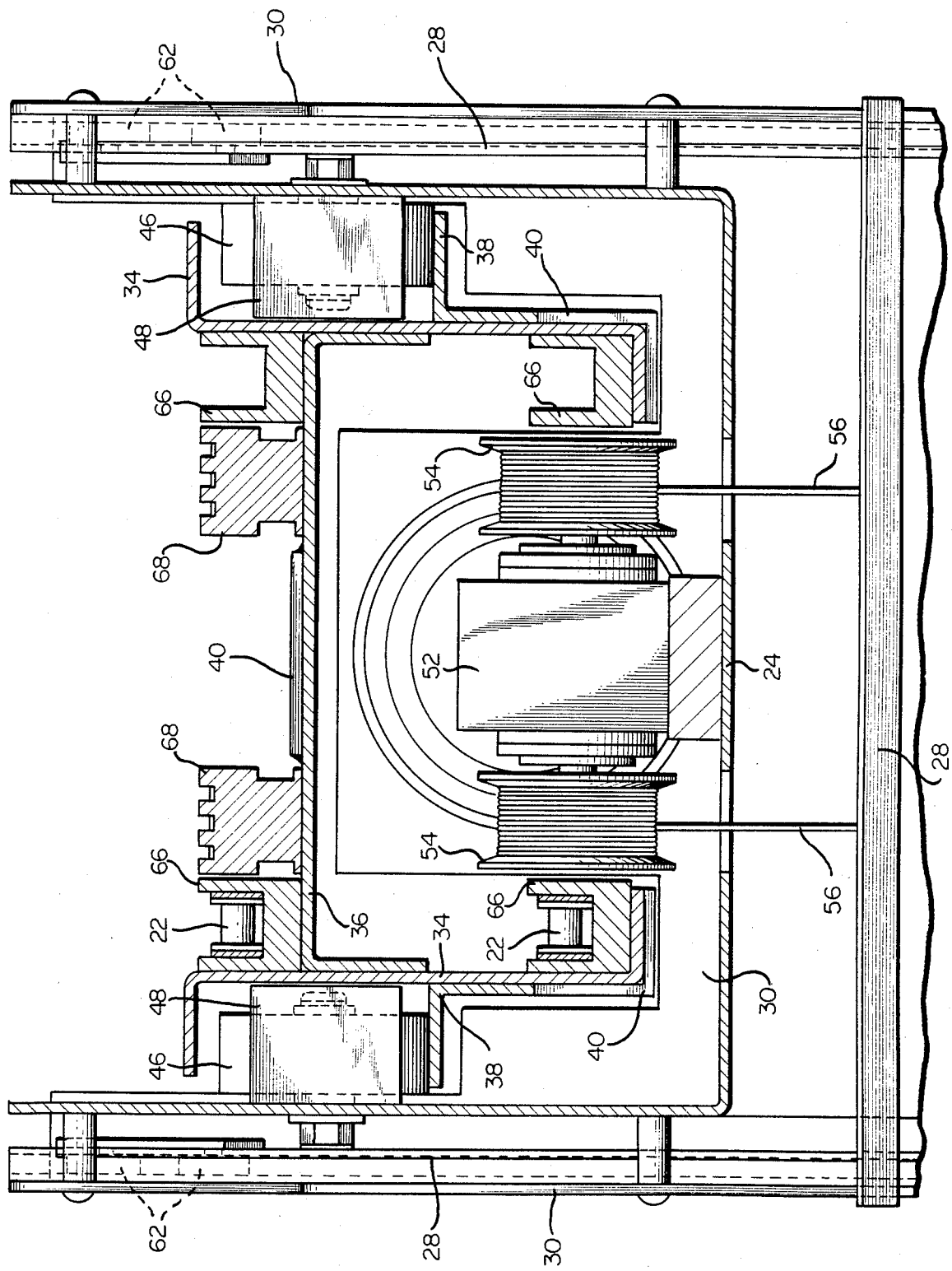
FIG. 6 is a sectional view taken along the line 6—6 of FIG. 2, of the present invention.

As is shown in FIG. 6, the base of cart 24 also supports lift means 26 which is centrally located between the arms of cart 24. Lift means 26 includes a lift motor 52 which drives lift spools 54 around which is wound flexible cable 56. Cable 56 is connected to, and supports lift arm 28. The width of lift means 26 is less than the minimum dimension between support sides 34. This allows the vertical extention of lift means 26 to intrude into support 18.

Lift arm 28, as shown in FIGS. 1, 3 and 6, is basically fabricated with a 'U' shaped body having vertically extending arms. These arms in side view (FIG. 2) are very nearly a right equilateral triangle having nearly equal vertical and horizontal sides. A lift arm cross member 58 with a vertical stiffing web 60 extends between the arms of lift arm 28 near the horizontal side of the triangle furthest from the near right angle. Cable 56 is connected to lift arm cross member 58. Near the extemities of the vertical side of the triangular shaped arm of lift arm 28 are a pair of lift wheels 62. Lift wheels 62 are specially adaped to the guided within lift arm guide 30.

Lift arm guide 30, as is best seen in FIG. 3, is also basically fabricated with a 'U' shaped body. As is best seen in FIG. 2 the base of the 'U' depends at a slight angle from the vertical and its arms are spaced from and straddle cart 24 which support lift arm guide 30. The arms of lift arm guide 30 also straddle lift arm 28. On the interior of each arm of lift arm guide 30 is a guide channel 64 which is 'C' shaped and opens to the interior of crane body 16. Lift wheels 62, on lift arm 28, are guided within the guide chanels 64 to restrain movement of lift arm 28 in a horizontal plane. Alternate members of the pair of lift wheels 62 can staggered to run on opposing arms of guide channel 64.

Crane body 16 is fabricated from standard shapes as is support module 32.

Figure 7:
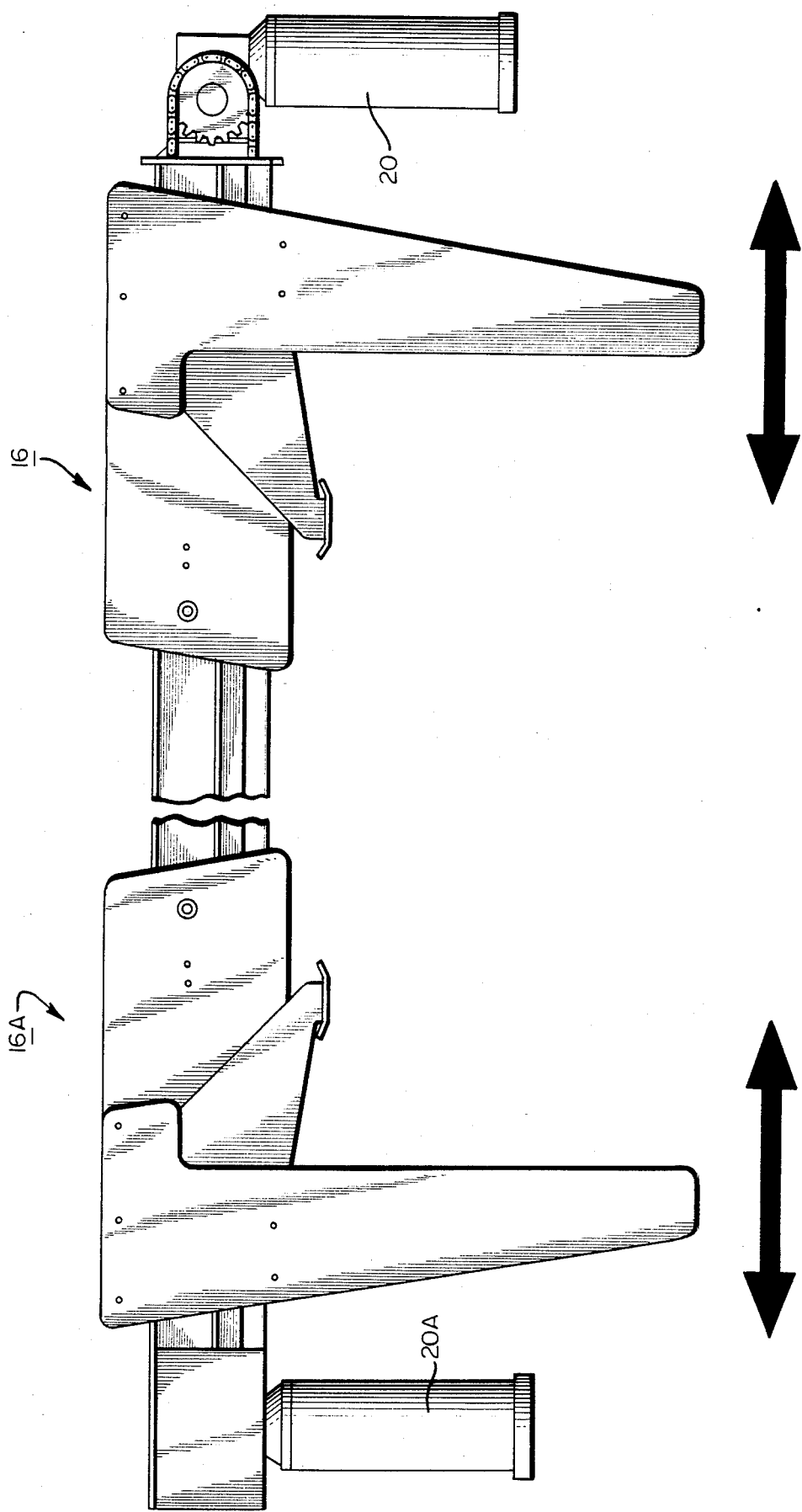
FIG. 7 is a side view of an alternate embodiment of the present invention.

Support beam 18 additionally carries chain guides 66 for roller chain 42. Chain guides 66 are advantageously fabricated from a ultra-high molecular weight polyethelene because of its lightness, strength, and self-lubricating properties. For each chain 42 one chain guide 66 is supported by the inwardly extending 'Z' arm of support side 34. Directly above that chain guide 66, another chain guide 66 is supported by the top of support top 36. Directly adjacent upper chain guide 66 is a rolling conductor support 68 of conventional design, symbolically shown, for conductors 70 which supply power to lift means 26. The combined width of chain guide 66 and rolling conductor support 68, does not extend half-way across width of support beam 18. As shown in FIG. 5, only half of the rolling conductor supports 68 and chain guides 66 are used for a single crane body 16. The unused chain guides 66 and roller support 68 may be utilized for another crane body 16a when two crane bodies 16, 16a are to be employed in hoist 14 as shown in FIG. 7. FIG. 7 also shows stationary drive means 20a which powers the traversing of crane 16a.

The transmission means and drive means 20a for the second crane body 16a of FIG. 7 operates in the same manner as that of the previously set forth for single crane body embodiment displayed in FIG. 1. When fully shown the components associated with second crane body 16a are in opposite symmetry to those associated with crane body 16.

The foregoing components of material finishing line 10 cooperate to produce a low cost easily fabricated material finishing line with reduced dead spaced which is particularly suitable for installations with constructed headrooms. It should be understood that various modifications, changes and variations may be made in the arrangement, operation and details of constructions of the elements disclosed herein without departing from the spirit and scope of this invention.

We claim:
1. A material finishing line comprising:
a essentially longitudinal series of work stations;
a stationary support beam having a relatively thin vertical dimension said beam extending horizontally above each of said work stations;
stationary drive means supported by said support beam;
transmission means extending along and supported by said support beam and operatively connected to said stationary drive means;
a cart supported by said support beam and operatively connected to said transmission means so that said cart may be selectively propelled along said support beam and having a relatively thin vertical dimension which has minimal extension beyond the vertical extension of said beam;
lift means supported by and substantially contained within said cart;
conductor means for suppling power to said lift means from a stationary source;
a lift arm connected to and supported by said lift means for operative connection to at least one workpiece, said lift arm allowing the workpiece to be raised and lowered, from and to at least one of said work stations; said lift arm being substantially aligned with said cart when said arm is fully raised, so that the vertical extension of said lift arm in a fully raised position substantially overlaps the vertical extension of said cart, thereby minimizing the portion of said lift arm extending vertically beyond the beam and the cart; and a lift arm guide supported by said cart for restraining movement of said lift arm in a horizontal plane relative to said cart.

2. A material finishing line as claimed in claim 1 wherein:
said work stations are arranged in a linear array;
said stationary support beam is a linear assembly of support modules each including;
two 'Z' shaped support sides
a 'U' shaped support top extending between and connecting together said 'Z' shaped sections,
two 'L' shaped support means extending longitudinally along the mid-side portion of said 'Z' shaped sections, and
support connection means adapted to connect the adjoining support modules; and
said stationary drive means is located at one end of said stationary support beam.

3. A material finishing line as claimed in claim 2 wherein:
said cart has a basically 'U' shaped body, the arms of which straddle said support beam and the base of which extends transversely to the longitudinal dimension of said support and the operative connection to said transmission means is provided by a drive bracket extending from the base of the 'U' towards the lower interior portion of said 'Z' shaped side portions of said stationary support whereon said transmission means partially extends;
said lift means includes a motor with a lift spool, said motor being supported on the base of said 'U' shaped cart and said motor with spool being wholly contained within said 'U' shaped cart without extending to the lower portion of said 'Z' shaped side portion of said stationary support beam.

4. A material finishing line as claimed in claim 3 wherein:
said lift arm is 'U' shaped in cross section and the arms of said 'U' are in transverse section nearly an equilateral right triangle having nearly vertical and horizontal equal sides, and includes; a lift arm cross member with a stiffening web extending between the arms of said 'U'; and
a lift cable would about the motor spool of said lift means and connected said lift arm near the stiffening web of said lift arm cross member.

5. A material finishing line as claimed in claim 4 wherein:
said lift arm guide is basically 'U' shaped with the base of the 'U' depending below said cart and the arms of said 'U' straddling said cart and depending from said cart essentially coextensively with the base of said 'U' and including a guide channel extending along the straddling and depending portions of each arm.

6. A material finishing line as claimed in claim 5 wherein:
the vertical extension of the arm of the 'U' shaped body of said cart and the extension of the vertical arms of the lift arm are substantially equal, so that said lift means may bring the lift arm cross member very close to the base of the 'U' shaped cart and provide substantial overlap of the arms said cart and lift arm whereby the thin vertical dimensions of said stationary support beam and said cart allow an increased lift range of said lift arm with a relatively small vertical dimension through which a workpiece cannot be lifted.

7. A material finishing line as claimed in claim 5 wherein:
said cart includes a pair of cart wheels on the interior of each arm of the 'U' shaped body, each wheel being located near the middle vertical extension of each arm towards the edges of the arm which define the longitudinal dimension of the arm along said support beam, said wheels supporting said cart on said stationary support beam and rolling along the horizontal portion of the 'L' shaped support means beneath the outward horizontal arm of said 'Z' shaped side portion of said stationary support beam; and
said cart further includes an alignment block adjacent each wheel to maintain the alignment of the base of the 'U' shaped cart in a horizontal plane.

8. A material finishing line as claimed in claim 7 wherein:
said lift arm includes at least two lift wheels on each arm of its 'U' shape, disposed adjacent the extremities of the vertical side of the arm and adapted to be guided by the guide channel.

9. A material finishing line as claimed in claim 8 wherein:
said lift arm include four lift wheels on each arm of its 'U' shape, disposed in pairs adjacent the extremities of the vertical side of the arm, each member of each pair being adapted to roll along one arm of a 'U' shaped guide channel.

10. A material finishing line comprising:
a series of work stations;
a stationary support beam wider than it is high supported horizontally above each work station;
a crane body traversable along said stationary support beam including a lift arm which may be brought into substantial alignment with said stationary support beam which supports said crane body, by substantially overlapping the vertical extension of said lift arm with the vertical extension of said beam, so that only a minimal;
stationary drive means supported by said stationary support beam and depending below said stationary support beam at a location outside that traversed by the lift arm of said crane body; and
transmission means operatively connected between said stationary drive means and said crane body to selectively propel said crane body along said stationary support beam said transmission means being at the same height as said support beam.

* * * * *